United States Patent [19]

Wheeler

[11] Patent Number: 4,717,930

[45] Date of Patent: Jan. 5, 1988

[54] INSTANT PHOTOGRAPHY WITH SUPERIMPOSED GRAPHICS

[76] Inventor: Alton D. Wheeler, 3940 Fox Meadow La., Pasadena, Calif. 77504

[21] Appl. No.: 918,718

[22] Filed: Oct. 14, 1986

[51] Int. Cl.$^4$ .................. G03B 15/03; G03B 17/24
[52] U.S. Cl. .................. 354/108; 354/126; 354/145.1; 354/295
[58] Field of Search ............ 354/107, 108, 125, 126, 354/145.1, 149.11, 295, 296, 202

[56] References Cited

U.S. PATENT DOCUMENTS

| | | | |
|---|---|---|---|
| 2,135,575 | 11/1938 | Hansch et al. | 354/126 |
| 2,683,603 | 6/1954 | Dine et al. | 354/145.1 |
| 2,760,048 | 8/1956 | Schulte | 354/126 |
| 3,916,423 | 10/1975 | Ueda et al. | 354/108 |
| 3,936,852 | 2/1976 | Turpin | 354/295 |
| 4,204,761 | 5/1980 | Walker | 354/202 |
| 4,268,144 | 5/1981 | Wheeler | 354/108 |
| 4,304,471 | 12/1981 | Jones et al. | 354/108 |
| 4,436,400 | 3/1984 | Charis et al. | 354/296 |
| 4,626,091 | 12/1986 | Ostermeier | 354/108 |

Primary Examiner—A. A. Mathews
Attorney, Agent, or Firm—William W. Haefliger

[57] ABSTRACT

A method of instant photography is disclosed wherein graphics are reproduced on a photographic print along with the image of an object whose photograph is taken using a camera. The method includes the steps:
  (a) producing a light flash,
  (b) and channeling at least some of the light to a zone proximate the camera lens and extending about the direct path of light that travels from said object through the lens to film in the camera,
  (c) whereby light channeled to that zone also passes through the lens and operates to illuminate the film, forming a light modulated background to the image of the object and also to the reproduced graphics.

23 Claims, 14 Drawing Figures

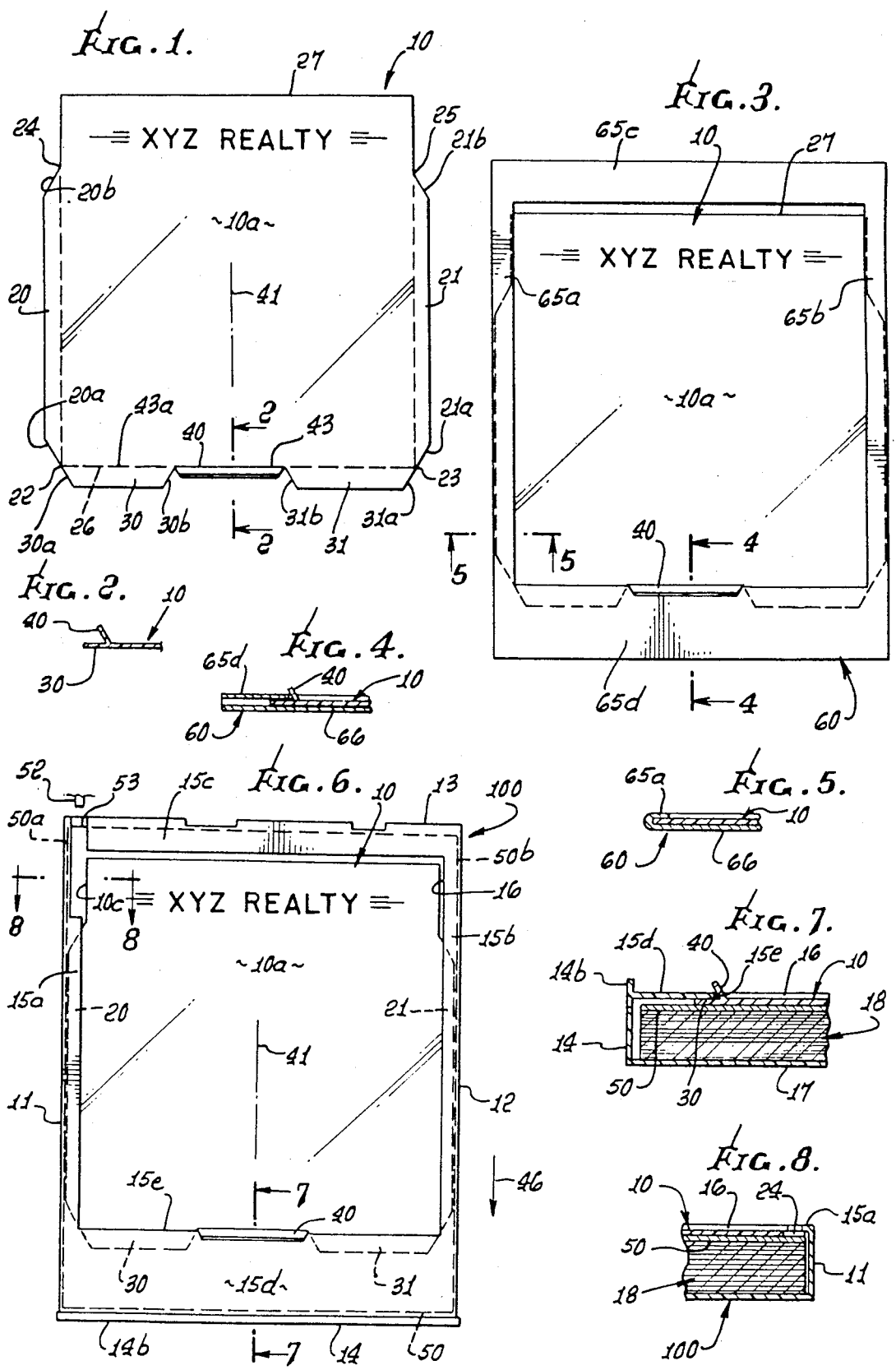

INSTANT PHOTOGRAPHY WITH SUPERIMPOSED GRAPHICS

BACKGROUND OF THE INVENTION

This invention relates generally to photography, and more particularly concerns the reproducing of selected images within a camera on film being exposed to light coming from sources outside a camera. The invention relates to and improves upon the disclosure of U.S. Pat. No. 4,268,144.

There is a perceived need for means to permit a photograph to "label" films with selected images in addition to those resulting from entrance of external light into a camera. Thus, for example, it is of great commercial advantage to form an image or service mark of a business onto films exposed to light coming from an object or building associated with that business, all at the time of exposure of the film. Many other examples of such need for film labeling exist. There is also a need to provide a light modulated background for such. However no prior device embodying the unusual advantages of the herein described device, meeting such needs has existed, to applicant's knowledge.

SUMMARY OF THE INVENTION

It is a major object of the invention to provide a device of the character referred to, and which is usable in conjunction with a flash camera and with exposure of a film carried by the camera when the light flash is operated. Basically, the device comprises:

(a) means for channeling at least some of the light to a zone proximate the camera lens and extending about the direct path of light that travels from said object through said lens to film in the camera, (b) and structure positioning said means at the front of the camera.

Further, the zone may be generally tubular, and light at the zone may be diffused by roughened walls of that zone. Typically, the zone is generally elliptical, and has forwardly extending elliptical walls, the body consisting of clear plastic material, the walls being roughened, the zone adapted to pass light rays from the object in a rearward direction along an optical path toward the lines. Also, the light channeling means, or block, may extend into proximity to the flash producing means and to said zone, and at the front of the camera, whereby light from the flash is channeled to said zone in conjunction with opening of the camera shutter. The block may be transparent, and have light reflecting planar surfaces spaced about the zone for reflecting light traveling in said body toward that zone. Light at the zone may be increased or decreased, controllably.

It is another object of the invention to provide a receptacle for a print holder, and including said holder having front and back components between which a print is placed so that said image, reproduced graphics and background are visible at one side of the holder.

The invention also contemplates a method of instant photography wherein graphics are reproduced on a photographic print along with the image of an object whose photograph is taken using a camera, the improvement comprising (a) producing a light flash, (b) and channeling at least some of the light to a zone proximate the camera lens and extending about the direct path of light that travels fron the object through the lens to film in the camera, (c) whereby light channeled to said zone also passes through the lens and operates to illuminate the film, forming a light modulated background to the image of said object and also to said reproduced graphics.

These and other objects and advantages of the invention, as well as the details of an illustrative embodiment, will be more fully understood from the following specification and drawings, in which:

DRAWING DESCRIPTION

FIG. 1 is a plan view of a transparent template embodying the invention;

FIG. 2 is a section on lines 2—2 of FIG. 1;

FIG. 3 is a plan view of the FIG. 1 template on a carrier that simulates a film pack frame;

FIG. 4 is a section taken on lines 4—4 of FIG. 3;

FIG. 5 is a section taken on lines 5—5 of FIG. 3;

FIG. 6 is a plan view of a frame for a film pack, with the FIG. 1 template carried by the frame;

FIG. 7 is an enlarged section on lines 7—7 of FIG. 6;

FIG. 8 is an enlarged section on lines 8—8 of FIG. 6;

FIG. 9 is a side elevation or view of a camera incorporating the invention;

FIG. 10 is a fragmentary top plan view of a portion of the FIG. 9 camera, and taken on lines 10—10 of FIG. 9;

FIG. 11 is a frontal elevation on lines 11—11 of FIG. 9;

DETAILED DESCRIPTION

Figures 9, 10, 11:
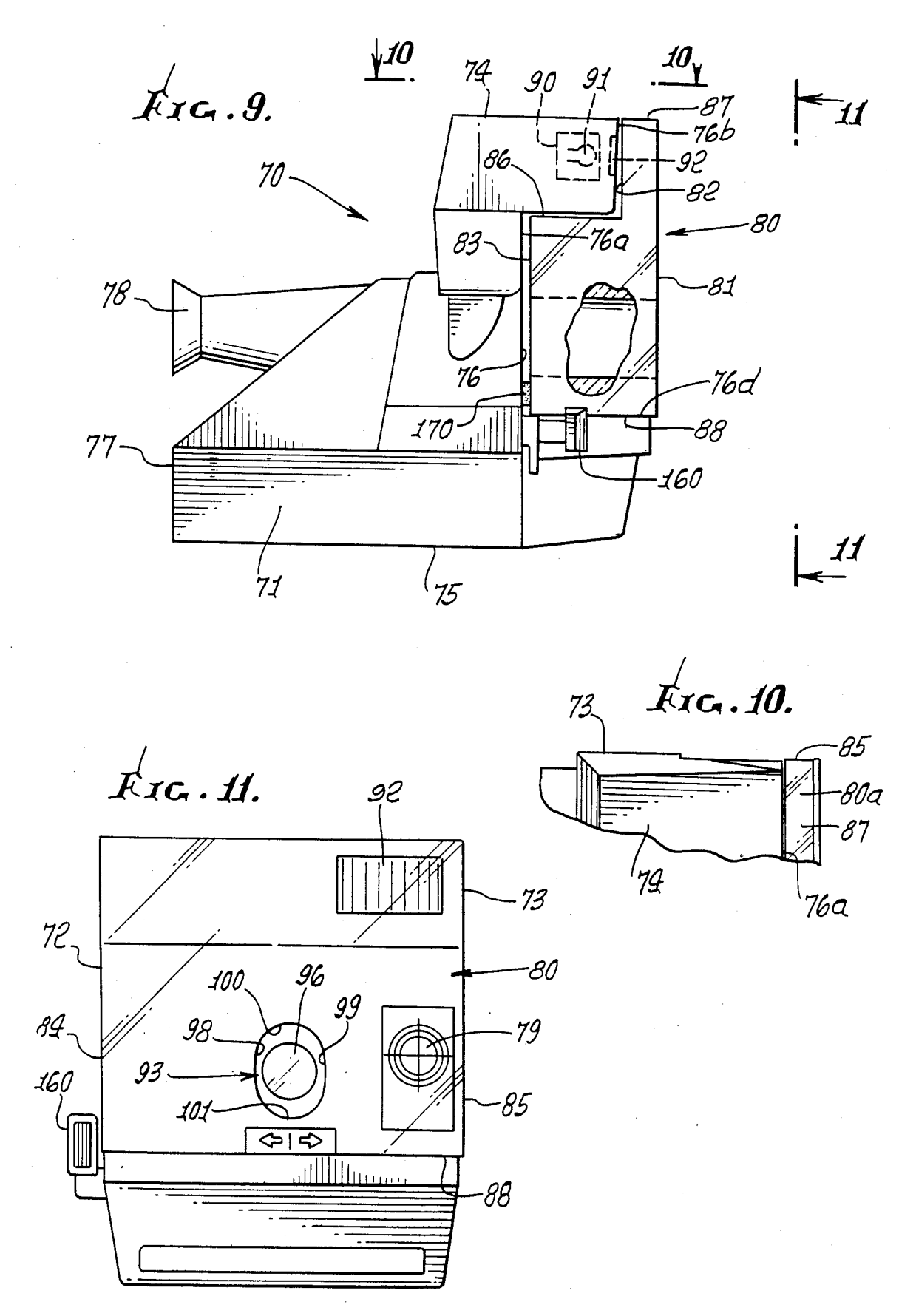
Figure 12:
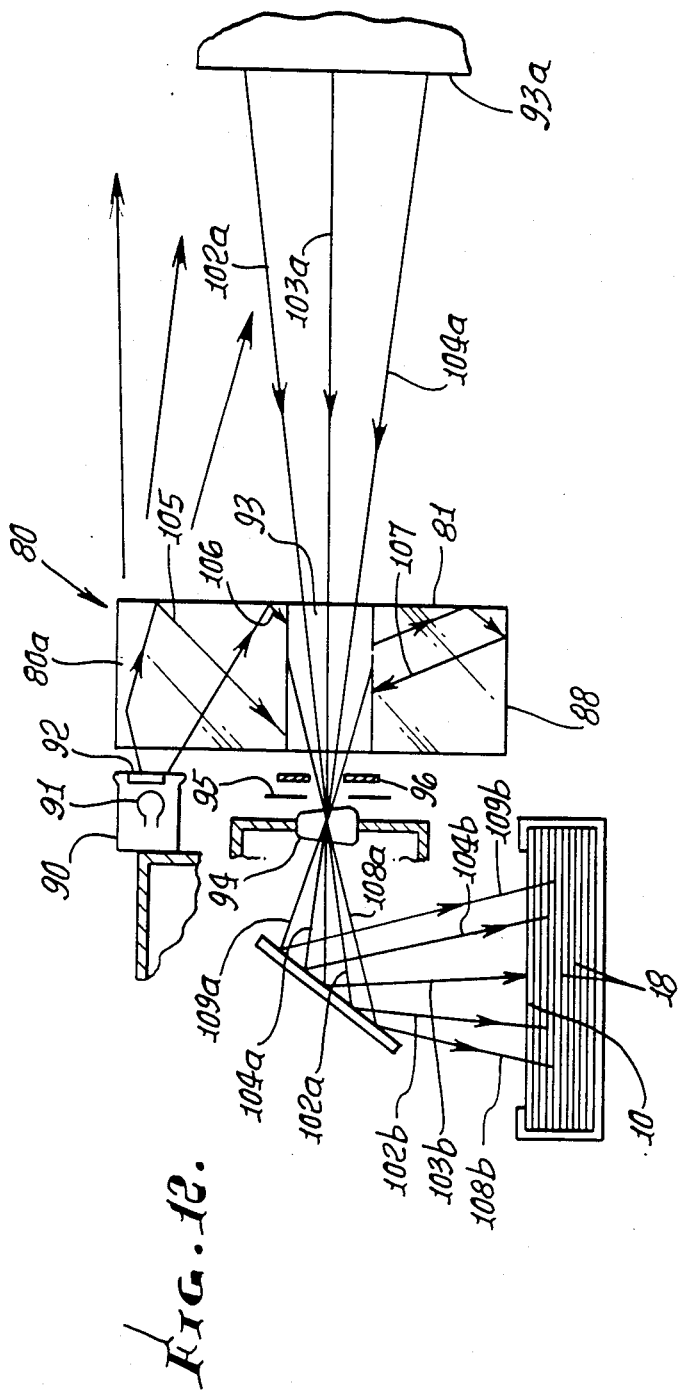
FIG. 12 is a schematic view of optical components.

Referring first to FIGS. 9-11, a camera 70 includes a housing 71 having opposite sides 72 and 73, top 74, bottom 75, front wall 76, and rear wall 77. An eyepiece housing for viewing a target is shown at 78, the corresponding window in the front wall of the housing indicated at 79. The latter is seen in FIG. 11 through a transparent body or block overlying the window at the front thereof. That body also may extend across the length and width of the front of the camera housing, above level 88. Body 80 has a front wall 81, rear walls 82 and 83, opposite sides walls 84 and 85, top walls 86 and 87, and bottom wall 88. Accordingly, it closely fits the space defined by housing front wall sections 76a (facing body upright wall 83), 76b (facing upright body wall 82), 76c, (facing body horizontal wall 86), and 76d (facing body horizontal wall 88). The body 80 may consist of clear transparent plastic material, such as LUCITE, and be positioned by camera housing walls or structure, at the front of the camera, for purposes to be described. A POLAROID camera is one example.

The camera also includes a means for producing a light flash to illuminate the object 93 whose photograph is being taken. Such a means is indicated at 90 in FIG. 9, and may include a flash bulb 91, also seen in FIG. 12. A transparent window 92 in the camera front wall 76b passes the generated light forwardly. See also trigger 160.

In accorance with the invention, means such as block 80, is provided for channeling at least some of the light produced by the flash to a zone proximate the camera lens and extending about the direct path of light that travels from the object through the lens, to the film in the camera. That zone is generally tubular, and is indicated at 93 forward of lens 94, shutter 95, and front window 96. More specifically, the zone 93 is generally elliptical, having forwardly extending elliptical walls 98-101 formed by the block 80, those walls being roughened to diffuse light transmitted within the block and toward zone 93, impinging on such walls. Such light is transmitted from the flash bulb 91 through window 92 and into the upper extent 80a of the block 80, some of the light being reflected off the walls 81, 84, 85 and 88 toward zone 93 where it impinges on the walls 98-101. The remainder of the light from the flash passes through the block and to the object 93a, illuminating same at the time of film exposure, as by opening of shutter 95.

The direct path of light traveling from the object 93 to and through the lens (to the film 18 in the film pack) is indicated by rays 102a and 102b, 103a and 103b, and 104a and 104b, a mirror reflecting rays 102a, 103a and 104a toward the film as rays 102b, 103b and 104b. Light channeled to zone 93 via the block 80 (see rays 105, 106 and 107, for example) illuminates diffusing walls 96-101, which may be roughened for enhanced illumination. Such illumination also passes through the lens (see rays 108a and 108b, and 109a and 109b, for example) and operates to locally illuminate the film forming a light modulated background to the image of the object and to the image of reproduced graphics, as will be referred to. The graphics template overlying the film 18 in the film pack is indicated at 10.

Further, it will be observed that the elliptical or tubular bore defined by the walls of zone 93 has an axis generally coincident with an axis 111 defined by the camera lens, and extending forwardly.

Figure 13:
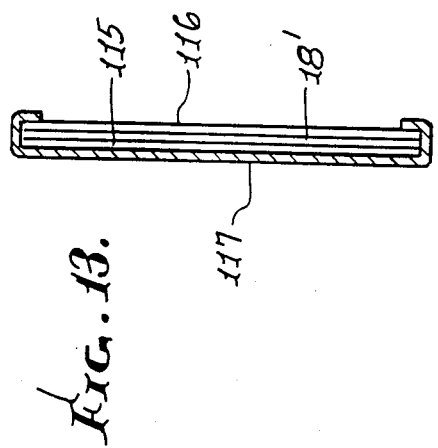
FIG. 13 shows a print in a backer.

The resultant film, when developed and displayed as a print 18' in FIG. 13, portrays a light modulated, i.e. white or near white, background on which a clear image of the object appears along with a clear image of graphics affixed to the template 10. For example, the template graphics may consist of an event representation (year, title, etc.) portrayed on the print; the portrayed object may be in the form of a portrait of a person; and these elements are on a white background obtained by the use of the channeled light from the flash. In FIG. 13, the print is mounted on a backer 115, its front is covered by a transparent sheet or disc 116, and flat receptacle 117 retains the elements in stacked relation.

Figure 14:
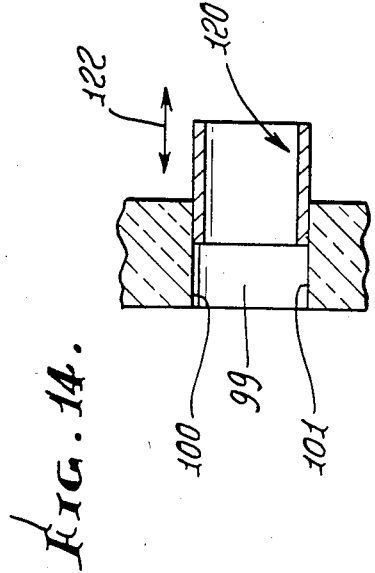
FIG. 14 shows a shiftable mask.

FIG. 14 shows a means such as a shiftable mask 120 to control the amount of light transmitted via walls 98-101 to the film. Mask 120 comprises a thin walled loop fitting the walls 98-101 and slidable forwardly and rearwardly (see arrow 122) to variably cover the walls. Mask 120 may be transparent and colored, such as blue or green, to add coloring to the background produced on the film.

The block walls may carry reflecting material to reflect the rays in the block. Block mounting adhesive is shown at 170, for example.

Referring now to FIG. 1, device 10 comprises a template adapted for use in conjunction with exposure of photographic film carried by structure that includes a frame. One such frame appears at 100 in FIGS. 6-8, and includes side walls 11 and 12, front and rear walls 13 and 14, a top cover having portions 15a-15d bordering an opening 16, and a bottom cover 17. That frame may consist of lightweight plastic material, as for example is exemplified by the POLAROID SX-70 LAND FILM frame for a film pack, as is seen at 18 in FIGS. 7 and 8.

The top portion 14b of wall 14 is removable to allow pull-out removal of film, in use.

Referring back to FIG. 1, the template is in the form of a transparent, generally planar and rectangular plastic sheet adapted to cause an image to be reproduced on successive film sheets 18. Merely as illustrative, the template is shown to carry the image "XYZ REALTY", as in the form of heavy dark lines and that image is successively reproduced on each sheet of film 18 as that sheet is exposed to light passing through the template and onto the film, as the camera (into which the film pack is inserted) is operated.

The template, which may consist of polyethylene about 0.005 inches thick, for example, has retainer tabs projecting at multiple edge portions of the sheet to removably fit beneath two or more of the frame border portions 15a-15d, thereby to removably retain the template to the frame structure so that the main central extent 10a of the template overlies the stack of film sheets 18 in the pack carried by the frame. More specifically, the multiple tabs include two longitudinally elongated, like, relatively narrow, parallel tabs 20 and 21 projecting oppositely at opposite sides of the template. Those Those tabs extend from locations 22 and 23 adjacent one end 26 of the template toward the opposite end 27 of the latter, but terminate at locations 24 and 25 in spaced relation to that opposite end of the template. Tabs 20 and 21 have tapered end terminals 20a and 20b, and 21a and 21b, whereby the tabs have trapezoidal shape. The tab widths are desirably each about 0.14 inch.

Further, the multiple tabs also include two laterally elongated tabs 30 and 31 at said one end 26 of the template, the tabs 30 and 31 being in lateral alignment, spaced apart and in the plane of the template. They have tapered terminals 30a, 30b, 31a and 31b, and terminals 30a and 20a are typically in alignment as are terminals 31a and 21a. Thus, tabs 30 and 31 are also trapezoidal in outline. The number of exposed, sharply pointed corners is thereby reduced, aiding insertion of the tabs beneath frame structure as seen in FIG. 6. The width of each tab 30 and 31 is approximately 0.20 inch.

The limit tab 40 is generally located between tabs 30 and 31, to extend in alignment with the longitudinally extending central axis 40 of the template, thereby to centrally receive force resulting from engagement with edge 15b of frame cover portion 15a (see FIG. 7). Note that the width of the limit tab is considerably less than the widths of tabs 30 and 31, so as not to project materially above the top plane of the pack from 100 (i.e. so as not to interfere with insertion of the frame into the camera). Thus, the width of tab 40 is typically about 0.075 inch. It joins the template along a lateral hinge line 43 which is in generally endwise alignment with the lines 43a of juncture of the tabs 30 and 31 with the template. In this regard, all tabs and the template may consists or be formed of the same transparent plastic material.

In FIG. 6, the tabs 20 and 21 removably fit beneath frame cover portions 15a and 15b, and extend to frame walls 11 and 12 to centrally position the template in the frame, i.e. against appreciable lateral movement. Also, tabs 30 and 31 removably fit beneath frame cover portion 15d, whereas limit tab 40 projects upwardly to flatly engage edge 15e as referred to, blocking movement of the template in the direction of arrow 46 (the direction of film withdrawal from the pack or frame). Thus, the template remains in the frame, while successive film sheets are withdraw, so that each time a film sheet is exposed, the image on the template is reproduced on the film exposed. The template may be removed from the pack or frame for later use with another frame.

A protective cardboard sheet 50 is shown overlying the top of the film pack and underlying the template. The longitudinal edges 50a and 50b of the sheet 50 also underlie frame cover portions 15a and 15b. As the pack is inserted into a camera, a pusher 52 in the camera pushes against edge 53 of the cardboard to push it out of the pack in the direction of arrow 46. Since template 10 is relieved at 10c, it is not engaged by the pusher 52. Note that template tab 20 is not exposed at the cut-away section 15aa of the cover portion 15a, but remains beneath portion 15a.

FIGS. 3-5, show a cardboard holder 60 which interfits the template and tabs in the same manner as frame 100, for instructional purposes. Thus, the template purchaser sees how the template interfits its holder 60 at the time of purchase, and he can then easily remove it from the holder and attach it to film pack. Elements 65a-65d correspond to elements 15a-15d. The bottom of the holder appears at 66. FIGS. 1-8 are also described in my U.S. Pat. No. 4,268,144.

I claim:

1. In the method of instant photography wherein graphics on a template are reproduced on a photographic print along with the image of an object whose photograph is taken using a camera, the improvement comprising the steps
    (a) producing a light flash,
    (b) and channeling at least some of the light to a zone proximate the camera lens and defining a light diffusing wall extending about an open space forming the direct path of light that travels from said object through said lens to film in the camera,
    (c) whereby light channeled to said zone and through said wall also passes through the lens and operates to illuminate the film forming a light modulated background to the image of said object and also to said reproduced graphics,
    (d) and locating the template to pass said light channeled through said diffusing wall.

2. The method of claim 1 wherein said zone is tubular and light at said zone is diffused.

3. The method of claim 1 wherein the light flash is produced in conjunction with opening of the camera shutter.

4. The method of claim 3 wherein the light from said flash is channeled via a transparent body at the front of the camera, the body having edges, and including reflecting light traveling in said body from certain edges and toward said zone.

5. The method of claim 4 including extending said body into the path of light traveling from a flash bulb carried by the camera.

6. The method of claim 1 including providing a print holder having front and back components, placing the print between said components so that said image, graphics and background are visible at one side of the holder.

7. The method of claim 4 including attaching said transparent body to the camera prior to said flash production.

8. The method of claim 1 including variably controlling the amount of light transmitted from walls of said zone to the lens.

9. Apparatus for use in the method of instant photography wherein graphics are reproduced on a photographic print along with the image of an object when the photograph is taken using a camera having means for producing a light flash comprising
    (a) means for channeling at least some of the light to a zone proximate the front of the camera lens and defining a light diffusing wall extending about an open space forming the direct path of light that travels from said object through said lens to film in the camera,
    (b) and structure positioning said means at the front of the camera, and
    (c) said graphics located on a template which is positioned to pass light channeled through said diffusing wall.

10. The apparatus of claim 9 wherein said zone is generally tubular, and light at said zone is diffused.

11. The apparatus of claim 9 wherein said zone is generally elliptical, and has forwardly extending elliptical walls, the body consisting of clear plastic material, the walls being roughened, said zone adapted to pass light rays from said object in a rearward direction along optical path toward the lens.

12. The apparatus of claim 9 wherein said light channeling means extends into proximity to the flash producing means and to said zone, and at the front of the camera, whereby light from said flash is channeled to said zone in conjunction with opening of the camera shutter, the template located at a film pack in the camera.

13. The apparatus of claim 12 wherein said light channeling means comprises a transparent body having light reflecting planar surfaces spaced about said zone for reflecting light traveling in said body toward said zone.

14. The apparatus of claim 13 wherein said body has a bore defining said zone, said bore being roughened to diffuse light.

15. The apparatus of claim 14 wherein said bore has an axis generally coincident with an axis defined by the camera lens.

16. Apparatus for use in the method of instant photography wherein graphics are reproduced on a photographic print along with the image of an object when the photograph is taken using a camera having means for producing a light flash comprising
    (a) means for channeling at least some of the light to a zone proximate the front of the camera lens and defining a light diffusing wall extending about an open space forming the direct path of light that travels from said object through said lens to film in the camera.
    (b) and structure positioning said means at the front of the camera,
    (c) said zone having wall means and being generally tubular, and light at said zone is diffused,
    (d) and including a mask variably shiftable relative to said zone to variably control light that travels from said wall means to the lens.

17. The apparatus of claim 16 wherein the mask is transparent and colored to transmit colored background light to the lens.

18. Apparatus for use in the method of instant photography wherein graphics are reproduced on a photographic print along with the image of an object when the photograph is taken using a camera, comprising:
    (a) means for effecting light tranmission to a zone defining a light diffusing wall extending about the direct path of light that travels from said object, via a lens, to film in the camera, (b) said means associated with the camera, and located outside said direct path of the light, (c) said graphics located on a template which is positioned to pass light channeled through said diffusing wall.

19. The apparatus of claim 18 wherein said means includes at least one light reflecting surface.

20. The apparatus of claim 18 wherein the camera incorporates an electrically energized light source, and said means is in the path of light transmission from said source.

21. The apparatus of claim 18 including said camera and said means is carried by the camera.

22. The apparatus of claim 21 including a film pack in the camera, and graphics associated with said pack, the graphics being in the path of light transmission from said source.

23. The apparatus of claim 18 wherein said (a) means includes a solid body extending about said zone, but not in said zone.

* * * * *